(12) United States Patent
Suzuki

(10) Patent No.: US 10,746,707 B2
(45) Date of Patent: Aug. 18, 2020

(54) METHOD, SYSTEM, AND PROGRAM FOR ULTRASONIC TESTING AND STORAGE MEDIUM

(71) Applicant: Mitsubishi Hitachi Power Systems, Ltd., Yokohama (JP)

(72) Inventor: Yutaka Suzuki, Tokyo (JP)

(73) Assignee: Mitsubishi Hitachi Power Systems, Ltd., Yokohama (JP)

(*) Notice: Subject to any disclaimer, the term of this patent is extended or adjusted under 35 U.S.C. 154(b) by 184 days.

(21) Appl. No.: 15/896,447

(22) Filed: Feb. 14, 2018

(65) Prior Publication Data

US 2018/0259490 A1 Sep. 13, 2018

(30) Foreign Application Priority Data

Mar. 8, 2017 (JP) ................................ 2017-044345

(51) Int. Cl.
*G01N 29/26* (2006.01)
*G01N 29/34* (2006.01)
(Continued)

(52) U.S. Cl.
CPC ......... *G01N 29/262* (2013.01); *B06B 1/0207* (2013.01); *G01N 29/043* (2013.01);
(Continued)

(58) Field of Classification Search
CPC .......... G01N 2291/044; G01N 29/265; G01N 29/11; G01N 29/28; G01N 2291/02854
(Continued)

(56) References Cited

U.S. PATENT DOCUMENTS 4,829,491 A * 5/1989 Saugeon ............. G10K 11/346
367/103
5,115,416 A * 5/1992 Gehlbach ............... H04B 11/00
367/103
(Continued)

FOREIGN PATENT DOCUMENTS

EP 2 434 281 A2 3/2012
EP 2434281 A2 * 3/2012 ............. G01N 29/07
(Continued)

OTHER PUBLICATIONS

Extended European Search Report issued in counterpart European Application No. 18156831.2 dated Jul. 13, 2018 (10 pages).
(Continued)

*Primary Examiner* — Clayton E. LaBalle
*Assistant Examiner* — Kevin C Butler
(74) *Attorney, Agent, or Firm* — Crowell & Moring LLP

(57) ABSTRACT

A UT method includes steps of: placing multiple sensors on a test object, the sensors each having multiple elements; connecting the sensors to a UT device such that multiple elements each selected one by one from each of the sensors are set as one group, and the multiple elements belonging to a same group are selectively connected to a common connector of the UT device via a switcher; inputting to the UT device a collection of UT conditions used for the multiple sensors; causing the UT device to perform UT operations sequentially while switching the sensors connected to the UT device with the use of the switcher; and storing UT data in which the sensors used for UT match UT conditions on the basis of the order of execution of UT conditions included in the collection of UT conditions.

5 Claims, 11 Drawing Sheets

(51) Int. Cl.
　　　*G01N 29/22*　　(2006.01)
　　　*G10K 11/34*　　(2006.01)
　　　*G01N 29/04*　　(2006.01)
　　　*G01N 29/11*　　(2006.01)
　　　*B06B 1/02*　　(2006.01)
　　　*B06B 1/06*　　(2006.01)

(52) U.S. Cl.
　　　CPC .......... *G01N 29/11* (2013.01); *G01N 29/221* (2013.01); *G01N 29/343* (2013.01); *G10K 11/345* (2013.01); *G10K 11/346* (2013.01); *B06B 1/0292* (2013.01); *B06B 1/0607* (2013.01); *G01N 2291/015* (2013.01); *G01N 2291/044* (2013.01); *G01N 2291/0421* (2013.01); *G01N 2291/0422* (2013.01); *G01N 2291/106* (2013.01)

(58) Field of Classification Search
　　　USPC .......................................................... 73/620
　　　See application file for complete search history.

(56) References Cited

U.S. PATENT DOCUMENTS

| | | | | |
|---|---|---|---|---|
| 5,566,675 | A | * | 10/1996 | Li ................. G01S 7/52049 600/447 |
| 2004/0267126 | A1 | * | 12/2004 | Takeuchi ............ G01S 7/52046 600/447 |
| 2012/0095347 | A1 | | 4/2012 | Adam et al. |
| 2016/0061783 | A1 | * | 3/2016 | Viren .................... G01N 21/84 73/1.82 |
| 2017/0219536 | A1 | * | 8/2017 | Koch ................. G01N 29/0645 |
| 2018/0259490 | A1 | * | 9/2018 | Suzuki ................ G10K 11/346 |

FOREIGN PATENT DOCUMENTS

| | | |
|---|---|---|
| EP | 2 840 391 A1 | 2/2015 |
| JP | 10-311822 A | 11/1998 |
| JP | 2851114 | 11/1998 |
| JP | 2005-034633 | 2/2005 |
| JP | 2010-107284 | 5/2010 |
| JP | 2013-156277 | 8/2013 |
| JP | 2014-106130 A | 6/2014 |
| JP | 2015-040697 | 3/2015 |

OTHER PUBLICATIONS

Corresponding Japanese Office Action dated Jun. 23, 2020 with English translation.

* cited by examiner

FIG.1A  Conventional Technology
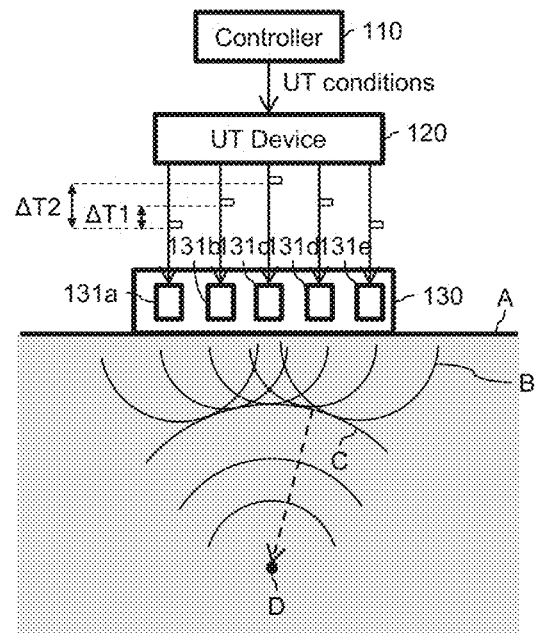
FIG.1B  Conventional Technology
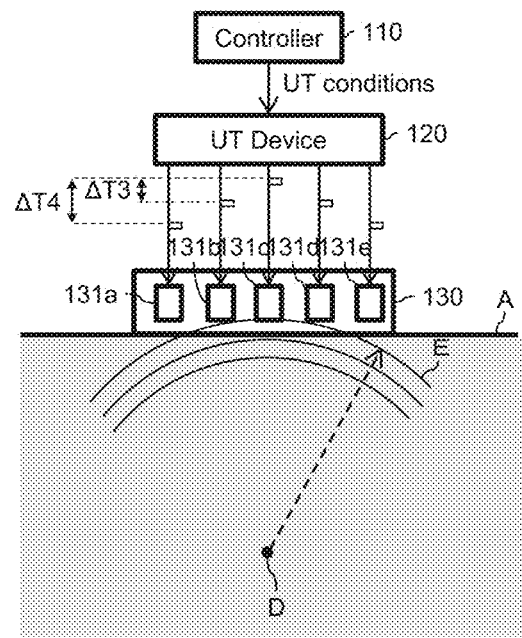

FIG.2A  Conventional Technology
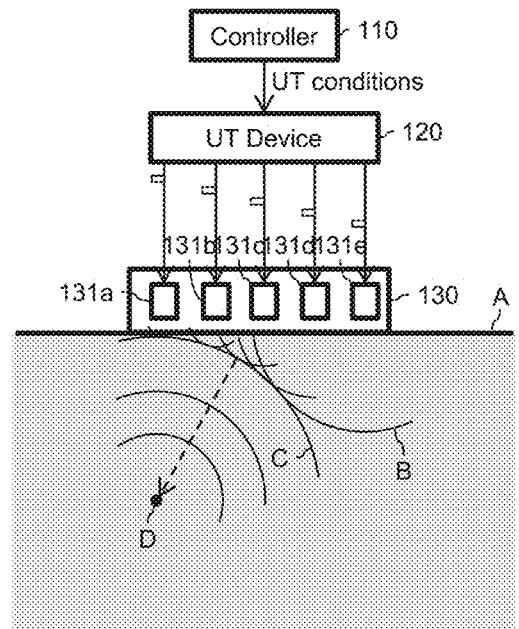
FIG.2B  Conventional Technology
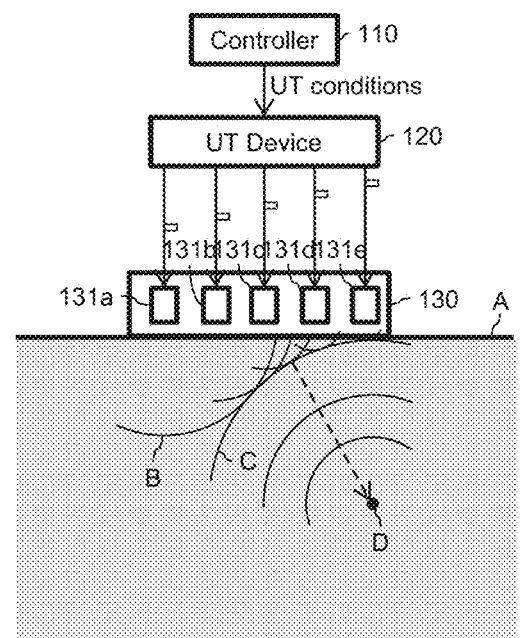

FIG.3A  Conventional Technology
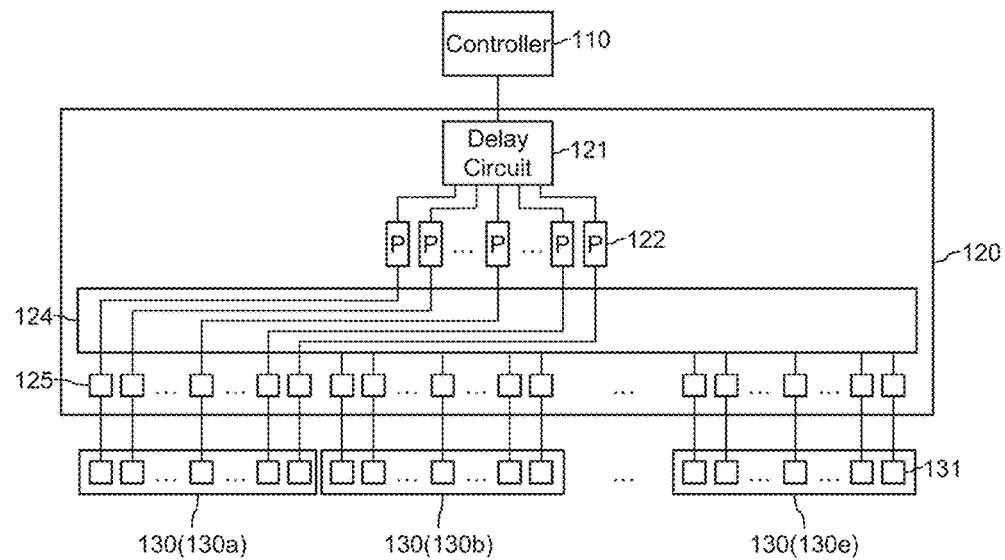
FIG.3B  Conventional Technology
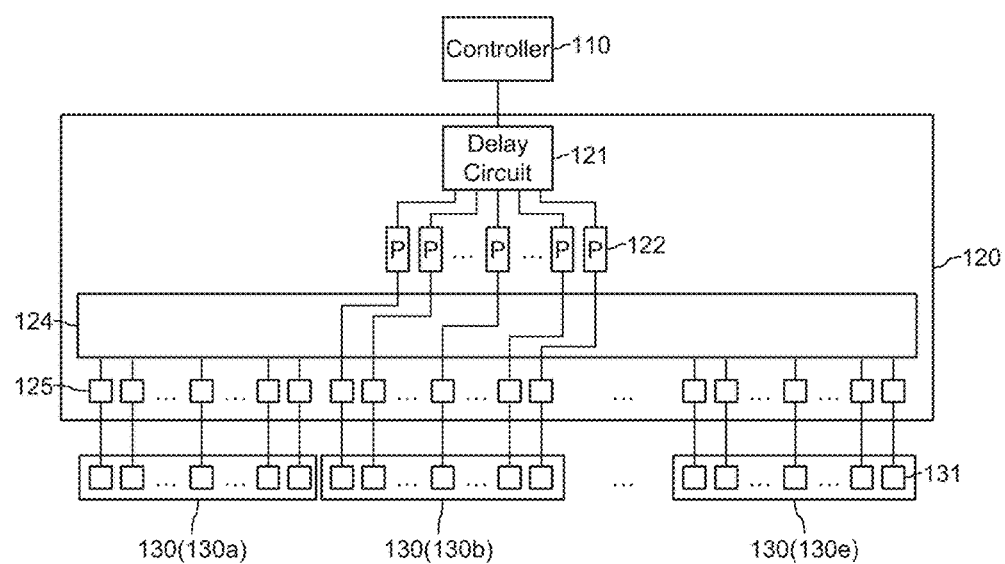

FIG.4A  Conventional Technology
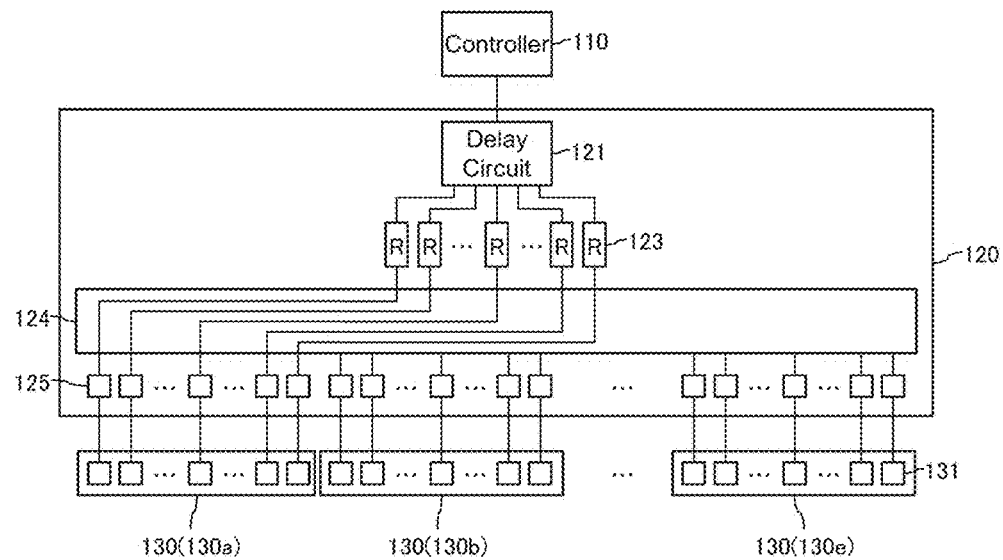
FIG.4B  Conventional Technology
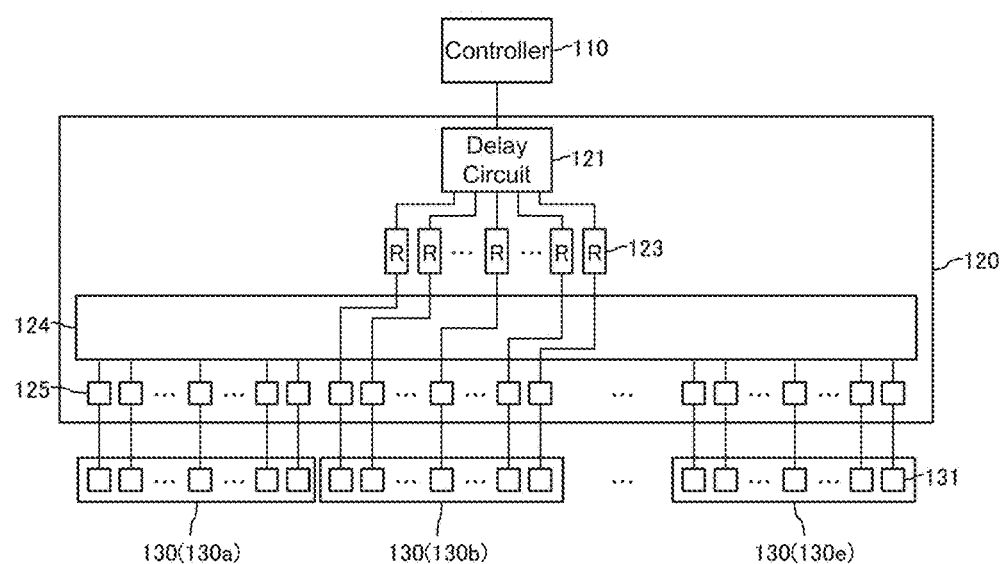

FIG.6A
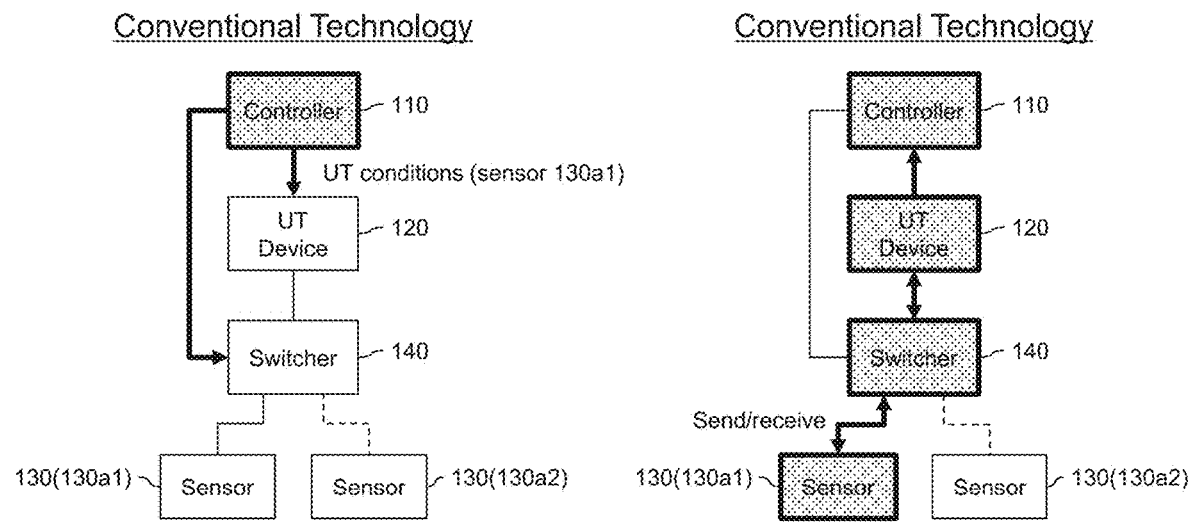
FIG.6B
FIG.6C
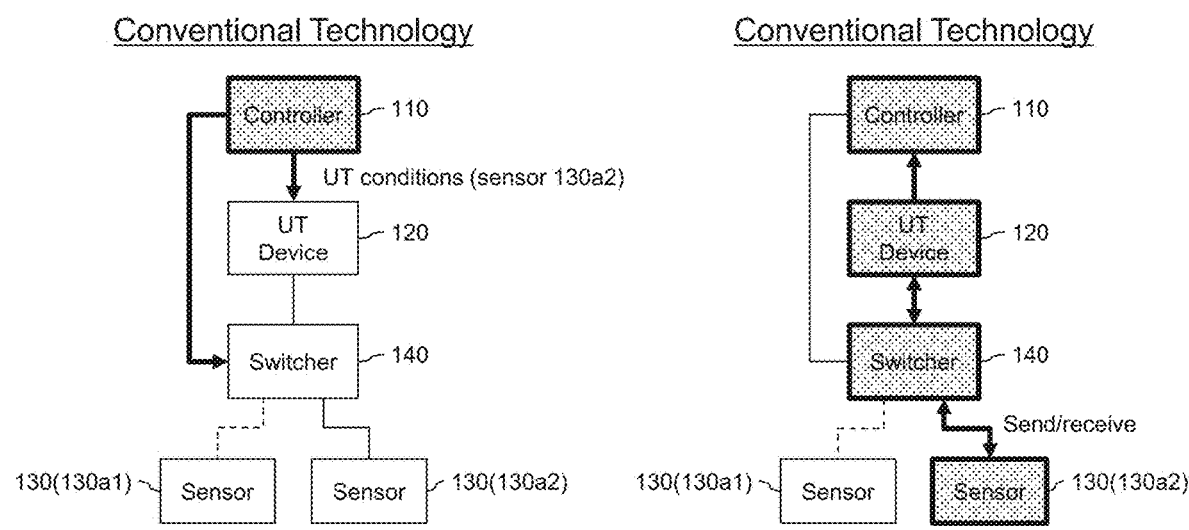
FIG.6D

METHOD, SYSTEM, AND PROGRAM FOR ULTRASONIC TESTING AND STORAGE MEDIUM

BACKGROUND OF THE INVENTION

1. Field of the Invention

The present invention relates to an ultrasonic testing method used to perform phased array ultrasonic testing (the term "ultrasonic testing" is hereinafter abbreviated as UT).

2. Description of the Related Art

In phased array UT, an object is examined for any internal imperfection by the multiple ultrasonic elements (hereinafter called elements) of an array sensor (hereinafter sensor) sending ultrasonic waves asynchronously and changing the point at which the ultrasonic waves reach at the same time (focal point) (see JP-2014-106130-A). Each element of the sensor is connected to a transmission circuit (pulser) of a UT device (phased array UT device) in a one-to-one correspondence relationship via a connector. The element sends ultrasonic waves by being excited by the pulsers ome UT devices have more connectors than they have pulsers and a switch circuit (e.g., relay circuit) used for switching the connections between the pulsers and the connectors. In such a UT device, multiple sensors are connected to the device, and the connections between the pulsers and the connectors, that is, the sensors that are to be electrically connected to the pulsers are sequentially switched (see JP-1998-311822-A).

SUMMARY OF THE INVENTION

To increase the number of sensors used in phased array UT, one possible method would be to increase the number of connectors by increasing the scale of the UT device. However, this requires preparing especially a greater scale of the UT device. Another method would be to connect multiple elements to each connector of the UT device via a switcher. By allowing the switcher to switch the elements that are to be electrically connected to the connector, the number of the installed sensors can be increased. This is advantageous in that the existing UT device still can be used.

However, when two sensors are connected via a switcher to a typical UT device, the UT device cannot recognize which sensor, first or second, is being made active by the switcher because the UT device often does not have the function of controlling the switcher. To overcome this, a controller such as a PC can be used to control the switcher, connect the first sensor to the UT device, write a UT condition for the first sensor on the UT device, and perform UT. In this way, by performing the step of writing a UT condition each time the sensors are switched for connection, phased array UT can be performed effectively even if many sensors are connected to the UT device via the switcher.

In this paragraph, a single phased array UT operation can be divided broadly into writing a UT condition on the UT device, performing UT operation, and storing UT data. The writing of UT condition often takes several to ten or more of times as long as the UT or the storing of UT data although the time may vary depending on use conditions (for instance, the UT operation itself often takes a few seconds while the writing takes about one minute). The UT operation itself and the storing of UT data take almost the same amount of time. Thus, the time required to write UT conditions greatly affects the total time of phased array UT. In light of this, performing the step of writing UT conditions on the UT device each time the sensors are switched will increase the total time of UT.

An object of the invention is to provide a UT method that allows phased array UT to be performed efficiently by the multiple sensors connected to a UT device using a switcher.

To achieve the above object, the invention provides an ultrasonic testing method including: placing a plurality of array sensors on a test object, the plurality of array sensors each having a multiple of ultrasonic elements; connecting the plurality of array sensors to a phased array ultrasonic testing device which are selectively connected to a common connector of the phased array ultrasonic testing device via a switcher; inputting at one time to the phased array ultrasonic testing device a collection of ultrasonic testing conditions including a plurality of ultrasonic testing conditions each of which is set individually for the plurality of array sensors; causing the phased array ultrasonic testing device to perform ultrasonic testing operations sequentially while switching the plurality of array sensors connected to the phased array ultrasonic testing device with the use of the switcher; and storing ultrasonic testing data in which the array sensors used for ultrasonic testing match ultrasonic testing conditions on the basis of the order of execution of ultrasonic testing conditions included in the collection of ultrasonic testing conditions.

In accordance with the invention, phased array UT can be performed efficiently by the multiple sensors connected to the UT device using the switcher.

BRIEF DESCRIPTION OF THE DRAWINGS

FIG. 1A is a conceptual diagram of phased array UT, illustrating the sending of ultrasonic waves;

FIG. 1B is a conceptual diagram of phased array UT, illustrating the receiving of reflected ultrasonic waves;

FIG. 2A illustrates the principles of scanning in phased array UT;

FIG. 2B illustrates the principles of scanning in phased array UT;

FIG. 3A illustrates the structural example of the switching of the connections between pulsers and connectors in a UT device;

FIG. 3B illustrates the structural example of the switching of the connections between pulsers and connectors in a UT device;

FIG. 4A illustrates the structural example of the switching of the connections between connectors and receivers in a UT device;

FIG. 4B illustrates the structural example of the switching of the connections between connectors and receivers in a UT device;

FIG. 6A is a schematic illustrating phased array UT procedures in which multiple sensors are connected to common connectors of a UT device;

FIG. 6B is a schematic illustrating phased array UT procedures in which multiple sensors are connected to common connectors of a UT device;

FIG. 6C is a schematic illustrating phased array UT procedures in which multiple sensors are connected to common connectors of a UT device;

FIG. 6D is a schematic illustrating phased array UT procedures in which multiple sensors are connected to common connectors of a UT device;

DESCRIPTION OF THE PREFERRED EMBODIMENT

Figure 5A:
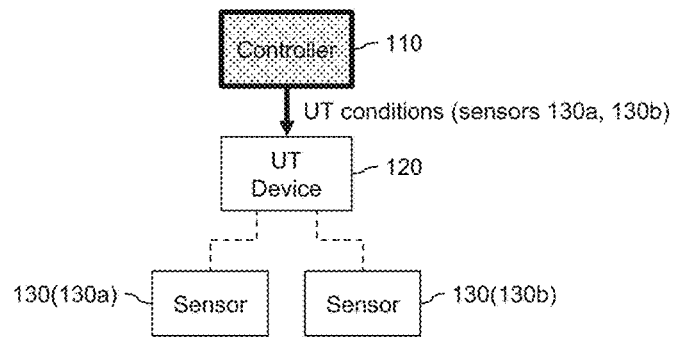
FIG. 5A is a schematic illustrating phased array UT procedures in which multiple sensors connected to different connectors of a UT device are used sequentially.
Figure 5B:
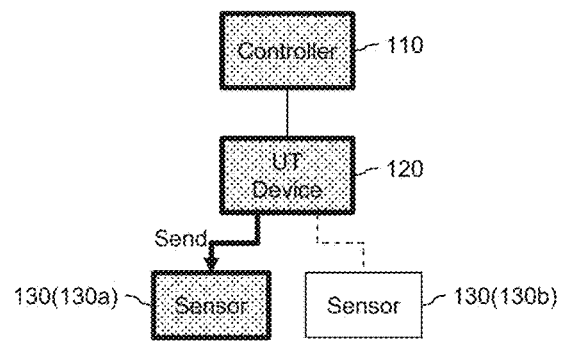
FIG. 5B is a schematic illustrating phased array UT procedures in which multiple sensors connected to different connectors of a UT device are used sequentially.

We will now describe the principles of phased array ultrasonic testing (UT) and the structure of a current standard system with reference to FIGS. 1 through 6, followed by a description of an embodiment of the invention with reference to FIG. 7 and the subsequent figures.

1. Technological Background

Before describing an embodiment of the invention, we first describe the technological background behind phased array UT with reference to figures to facilitate understanding of the invention.

1-1. Principles of Phased Array Ultrasonic Testing

At the first, the principles of phased array UT is described.

FIG. 1A is a conceptual diagram of phased array UT, illustrating the sending of ultrasonic waves. As illustrated, a phased array sensor 130 (hereinafter referred to as the sensor 130) is fixed onto a surface of a test object A. The sensor 130 includes multiple ultrasonic elements 131a to 131e such as piezoelectric elements (the ultrasonic elements 131a to 131e are hereinafter referred to as simply the elements 131a to 131e, and the number of the elements is five in the case of the figure). Each of the elements 131a to 131e is connected to a pulser (not illustrated) of a phased array UT device 120 (hereinafter referred to as the UT device 120) and excited by a voltage signal output from the pulser for a short amount of time (or for a fixed amount of time), thereby transmitting an ultrasonic wave B. The UT device 120 is connected to a controller 110 such as a personal computer. The UT device 120 includes a delay circuit for delaying the times (timings) at which the pulsers start to output voltages on the basis of the UT conditions input from the controller 110. The UT conditions input from the controller 110 to the UT device 120 are delay time data, namely, the data of different times at which the elements 131 start to transmit ultrasonic waves B to form a synthetic wave C (described later) that converges on a given focal point D. In the example of FIG. 1A, the elements 131a and 131e first transmit ultrasonic waves B at the same time, and the elements 131b and 131d then do the same after time ΔT1, followed by the transmission of an ultrasonic wave B from the element 131c after time ΔT2 (ΔT2>ΔT1). The times ΔT1 and ΔT2 are the delay time data (UT conditions). The delay times are determined on the basis of the position of the focal point D such that the ultrasonic waves B transmitted from the respective elements 131a to 131e will reach the focal point D at the same time. The simultaneous arrival of the ultrasonic waves D from 131a to 131e at the focal point D increases the sound pressure at the focal point D. The inside of the test object A can be scanned by performing UT several times while shifting the focal point D by changing the delay times.

FIG. 1B is a conceptual diagram of phased array UT, illustrating the receiving of reflected ultrasonic waves. Because the distances from the focal point D (acting as the source of reflection in the case of FIG. 1B) to the respective elements 131a to 131e are different, the ultrasonic waves reflected at the focal point D reach the elements 131a to 131e at different times (i.e., their arrival times vary). For that reason, the UT device 120 adds the intensity signals of the reflected ultrasonic waves received by the each elements 131a to 131e by taking into account their distances from the focal point D, thereby reception intensity is strengthened. In FIGS. 1A and 1B, the element 131c first receives a reflected ultrasonic wave E at time T0, then, the elements 131b and 131d receive reflected waves E after time ΔT3, followed by the receiving by the elements 131a and 131e after time ΔT4 (>ΔT3). In this case, the UT device 120 adds the signals received by the elements 131b and 131d after time ΔT3 and the signals received by the elements 131a and 131e after time ΔT4 to the signal received by the element 131c at time T0 and outputs the resultant signal to the controller 110 as UT data. The operation is performed by the delay circuit of the UT device 120 on the basis of the UT conditions.

As described above, phased array UT has features that detection sensitivity is enhanced by controlling the delay times such that the intensities of ultrasonic waves sent toward and the reception intensities of the waves reflected at the target point (focal point D) are increased.

FIGS. 2A and 2B illustrate the principles of scanning as for phased array UT. As illustrated in the figures, regarding phased array UT, scanning the inside of the test object A involves adjusting delay times to change the position of the focal point D (three-dimensional coordinates). In the example shown in FIG. 2A, ultrasonic waves B are sent from the elements 131e, 131d, 131c, 131b, and 131a in the stated order, and the focal point D is moved to the relatively left side to that of FIG. 1A. Oppositely, in the example shown in FIG. 2B, ultrasonic waves B are sent from the elements 131a, 131b, 131c, 131d, and 131e in the stated order, and the focal point D is moved to the relatively right side to that of FIG. 1A. Needless to say, as already described with reference to FIG. 1B, addition of the reflected waves E received by the elements 131a to 131e takes multiple addition steps at different times. In this way, by changing the position of the focal point D sequentially, the intensities of received signals increase when the focal point is in the position of an internal flaw or the like. Collection of the data which intensities of signal is higher than a given value makes possible to estimate the positon, size, or shape of the internal flaw.

1-2. Phased Array UT Device

With reference now to FIGS. 3A, 3B, 4A, and 4B, we describe an example configuration of connection switching within the UT device. In those figures, the already described elements are referred to by the same reference numerals as those used in the previous figures and will appropriately omit further. First, the UT device 120 shown in the figure has a following structure. The UT device 120 includes the controller 110 and multiple sensors 130. Similar to FIG. 1A, FIGS. 3A, 3B, 4A, and 4B show five sensors, 130a to 130e, by the way, these figures do not express limitation the number of sensors, and required the number of sensors is only plural. The sensors 130 are placed on a test object (not illustrated).

The UT device 120 includes a delay circuit 121, pulsers 122, receivers 123 (FIGS. 4A or so), a switch circuit 124, and connectors 125. The pulsers 122 can be D/A converters and are provided in plural in the single UT device 120. The pulsers 122 are connected to the delay circuit 121 and the switch circuit 124. The pulsers 122 receive input signals from the delay circuit 121, convert them into electric signals, and output the electric signals to the switch circuit 124. The receivers 123 (FIG. 4A or so) can be A/D converters, and the number of the receivers 123 provided in the single UT device 120 is equal to or greater than that of the pulsers 122. The receivers 123 are connected to the delay circuit 121 and the switch circuit 124, receive input signals from the switch circuit 124, convert them into digital signals, and output the digital signals to the delay circuit 121. The connectors 125 are used to connect the elements 131 to the switch circuit 124, and in this example, the number of the connectors 125 is greater than that of the pulsers 122. The switch circuit 124 is used to switch the connections between the pulsers 122 and the connectors 125 and the connections between the receivers 123 and the connectors 125 and can be a relay circuit. With the switch circuit 124, each pulser 122 is selectively connected to any one of the connectors 125. Likewise, with the switch circuit 124, each receiver 123 is selectively connected to any one of the connectors 125.

1-2A. Switching Connections Between the Pulsers and the Connectors

With FIGS. 3A and 3B, we describe the switching connections between the pulsers and the connectors 125 in the UT device. FIG. 3A illustrates the transmission of ultrasonic waves from the sensor 130a. The UT device 120 connect the elements 131 of the sensor 130a to one of the pulsers 122 through the connectors 125 useing the switch circuit 124 on the basis of the UT conditions input from the controller 110. This UT conditions input to the UT device 120 from the controller 110 include not only delay time information for the transmission of ultrasonic waves by the elements 131 but also the identification information of the connectors 125 to which the pulsers 122 and the receivers 123 are to be connected. After the UT conditions is written by the controller on the delay circuit 121, the UT device 120 drives the switch circuit 124 as stated above and uses the pulsers 122 to apply voltages to the elements 131 connected to the connectors 125. As already described with reference to FIGS. 1A and 2A, the ultrasound transmission time for each element 131 is adjusted by the delay circuit 121 such that ultrasonic waves converge on a target focal point.

FIG. 3B illustrates the transmission of ultrasonic waves from the sensor 130b. In the figure, each of the connectors 125 to which the elements 131 of the sensor 130b is connected to one of the pulsers 122 by the switch circuit 124. As is obvious, the switching of the connections between the pulsers 122 and the connectors 125 by the switch circuit 124 in the UT device 120 is based on the UT conditions sent from the controller 110. By thus changing the connection between the pulsers 122 and different connectors 125, the sensor 130 that is used to transmit ultrasonic waves is also changed.

1-2B. Switching of the Connections Between the Connectors and the Receivers

With FIGS. 4A and 4B, we describe the switching of the connections between the connectors and the receivers in the UT device. FIG. 4A illustrates the receiving of reflected ultrasonic waves by the sensor 130a. The UT device 120 connect each connectors 125 to the elements 131 of the sensor 130a using the switch circuit 124 based on the UT conditions input from the controller 110. The connectors 125 to which the receivers 123 are to be connected is changed depending on the UT conditions. In one case, the same elements 131 may be used to transmit ultrasound and receive reflected waves, in another case, the same connectors would be used for different elements of transmission and receive by switching the elements 131 during one sequence in a UT operation. When the elements 131 of the sensor 130a connected to connectors 125 receive reflected waves, the elements 131 output voltage signals via the connectors 125 to the receivers 123, where the signals are subjected to digitalization and the digitalized signals are input to the delay circuit 121. As described earlier with reference to FIG. 1B, the delay circuit 121 adds the signals together by taking the delay times into account and outputs as the detection data to the controller 110.

FIG. 4B illustrates the aspect of the receiving of reflected ultrasonic waves by the sensor 130b. In the figure, each of the connectors 125 to which the elements 131 of the sensor 130b are connected is connected to one of the pulsers 122 by the switch circuit 124. As is obvious, the switching of the connections between the receivers 123 and the connectors 125 by the switch circuit 124 in the UT device 120 is based on the UT conditions sent from the controller 110. In this way, connecting the receivers 123 to different connectors 125, the sensor 130 that is used to receive reflected waves is also changed.

1-3. Multi-Sensor UT

FIGS. 5A through 5E are schematics illustration of the phased array UT procedures in which switching of the connections between the connectors and the pulser/receiver using UT device and Multi-Sensor described with reference to FIGS. 3A, 3B, 4A, and 4B. For the sake of convenience, the term "multi-sensor UT" is hereinafter used to refer to the sequential performing of phased array UT using one sensor at a time in which each element of the sensors of the UT device is directly connected to one connector and the connections between the pulsers or receivers and the connectors are switched. "Directly connected" means connecting the terminal of an element to a connector without using a switcher described later. That is, multi-sensor UT is phased array UT in which multiple sensors connected to different connectors are used in a sequential order.

Referring to FIGS. 5A through 5E, we describe the procedures for multi-sensor UT in which UT is performed once with the use of the sensor 130a and again with the use of the sensor 130b by switching the connection between connectors and the pulsers/receivers, as described with reference to FIGS. 3A, 3B, 4A, and 4B. For simplification of the understanding, it is assumed that the same elements are used to transmission and receive reflected waves. In starting multi-sensor UT, the UT conditions is written on the UT device 120 by the controller 110 at the first (FIG. 5A). The UT conditions include both for the sensor 130a and the sensor 130*b*. Additionally, each condition includes the identification information of the connectors to which the pulsers are to be connected, the identification information of the connectors to which the receivers are to be connected, and the delay time data used for the sensors 130*a* and 130*b* that have been connected to the pulsers or the receivers.

Figure 5C:
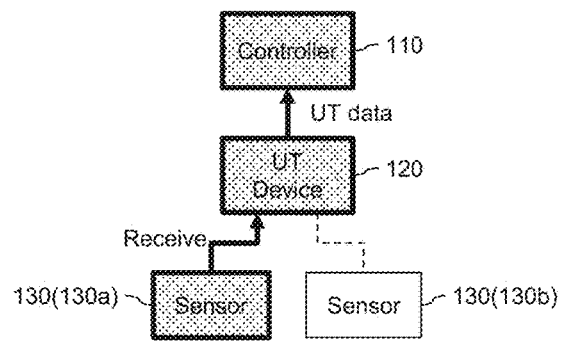
FIG. 5C is a schematic illustrating phased array UT procedures in which multiple sensors connected to different connectors of a UT device are used sequentially.

Then, the UT is performed using the sensor 130*a*. During that time, the switch circuit connects the pulsers to the connectors to which the elements of the sensor 130*a* are connected and the switch circuit also connects the receivers to the connectors to which the elements of the sensor 130*a* are connected. After the connection is switched, the elements of the sensor 130*a* transmit ultrasonic waves with time difference (FIG. 5B), receive the signals intensity of reflected waves which are added together by taking the delay times into account, and the added signal is output to the controller 110 as UT data (FIG. 5C).

Figure 5D:
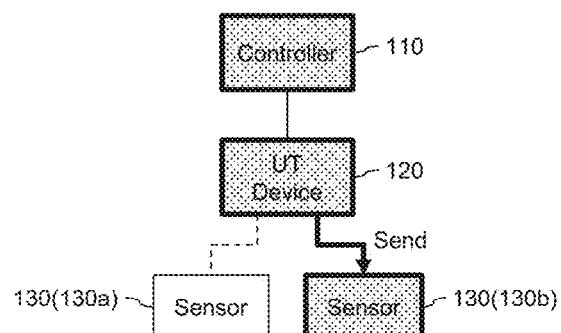
FIG. 5D is a schematic illustrating phased array UT procedures in which multiple sensors connected to different connectors of a UT device are used sequentially.
Figure 5E:
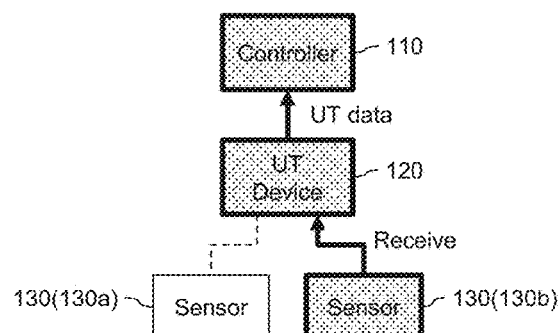
FIG. 5E is a schematic illustrating phased array UT procedures in which multiple sensors connected to different connectors of a UT device are used sequentially.

Subsequently, the UT is performed using the sensor 130*b*. During the testing, the switch circuit changes connection between the pulsers and the elements from the sensor 130*a* to the sensor 130*b*, then the elements of the sensor 130*b* transmit ultrasonic waves with time difference (FIG. 5D). Thereafter, the switch circuit connects the receivers to the connectors to which the elements of the sensor 130*b* are connected, the signals intensity of the reflected waves received by the elements of the sensor 130*b* are added together by taking the delay times into account, and the added signal is output to the controller 110 as UT data (FIG. 5E).

Still more, FIGS. 5A through 5E illustrate an example case where the first UT is performed by the sensor 130*a* and the second UT by the sensor 130*b*, furthermore, multi-sensor UT involves the use of more sensors, and each UT operation using one sensor is performed in the similar manner except that connection switching needs to be performed more frequently. Also, if different sensors are used for transmission and receiving reflected waves, the pulsers and the receivers are connected to different sensors on the basis of the UT conditions. As in the above, the transmission and the receiving are performed in a similar manner.

1-4. Mass-sensor UT

FIGS. 6A through 6D are schematics illustrating phased array UT procedures in which multiple elements are connected via a switcher to common connectors of the UT device described with reference to FIGS. 3A, 3B, 4A, and 4B and the multiple sensors connected to the connectors are used to perform phased array UT. For the sake of convenience, the term "mass-sensor UT" is hereinafter used to refer to connecting multiple sensors to a UT device by connecting multiple elements to each connector via a switcher and performing each of phased array UT operations with the use of a sensor or sensors while switching the elements connected to the connectors. That is, mass-sensor UT is phased array UT that involves the use of the multiple sensors connected to common connectors of the UT device. As illustrated in FIGS. 3A and 3B, in multi-sensor UT, the number of sensors that can be connected to a single UT device is limited by the number of connectors (the total number of elements), but in fact, it is demanded to connect much more sensors to the UT device. This demand can be satisfied by mass-sensor UT. In the mass-sensor UT, it is supposed that many sensors may be connected to a single UT device and multi-sensor UT may also be performed. However, mass-sensor UT is not necessarily based on the assumption that multi-sensor UT can also be performed together because there are also cases where the number of connectors in the UT device does not permit multi-sensor UT.

FIGS. 6A through 6D illustrate an example in which plural (two in the FIGS.) sensors 130*a*1 and 130*a*2 are connected via a switcher 140 to the same connectors of the UT device 120. The switcher 140 is a device connected to the connectors of the UT device 120 and capable of connecting multiple elements to each connector by diverging each connector to multiple switchable signal lines and connecting different elements to the terminals of the signal lines. With the switching function of the switcher 140, the signal lines are selectively connected to each connector. As a specific example, the switcher 140 includes multiple switching elements each having a first terminal and second terminals diverging therefrom. In this case, a connector 125 is connected to the first terminal, an element 131 is connected to one of the second terminals, and another element 131 is connected to the other of the second terminals. With the switcher 140, more elements can be connected to the UT device 120 than the number of the connectors. Referring to FIGS. 6A through 6D, we describe the procedures for mass-sensor UT in which UT is performed once with the use of the sensor 130*a*1 and again with the use of the sensor 130*a*2 by switching the connections between the sensors and the connectors. In this case, it is assumed that the same elements are used to transmission and receive reflected waves to facilitate understanding.

Before the starting mass-sensor UT, UT conditions are written by controller 110 on the UT device 120 (FIG. 6A). The UT conditions include only the UT conditions for the sensor 130*a*1, not the UT conditions for the sensor 130*a*2. The UT conditions for the sensor 130*a*1 written on the UT device 120 include the identification information of the connectors to which the pulsers are to be connected, the identification information of the connectors to which the receivers are to be connected, and the delay time data used for the sensor 130*a*1 when it has been connected to the pulsers or the receivers. In this example, the connectors that are to be connected to the pulsers are the connectors to which the sensors 130*a*1 and 130*a*2 are connected, and the connectors that are to be connected to the receivers are the connectors to which the sensors 130*a*1 and 130*a*2 are connected. At the same time as the writing of the UT conditions for the sensor 130*a*1, the switcher 140 is controlled by the command signal which is output from the controller 110, which control is performed independently from the control of the UT device 120, thereby connecting the sensor 130*a*1 to the UT device 120 (FIG. 6A).

Then the UT is performed using sensor 130*a*1. During the UT, the connectors to which the elements of the sensor 130*a*1 are connected via the switcher 140 are connected by the switch circuit to the pulsers and the receivers one after another within the UT device 120 so that the sensor 130*a*1 can perform UT (FIG. 6B). The processing by the delay circuit (including the transmission of ultrasound up to the outputting of UT data to the controller 110) is substantially the same as in FIGS. 5A through 5E except that signals need to pass through the switcher 140.

The UT using the sensor 130*a*2 is followed the UT using the sensor 130*a*1. During the transition to the UT using the sensor 130*a*2, the UT conditions is written by the controller 110 on the UT device 120 (FIG. 6C). These UT conditions include only the UT conditions for the sensor 130*a*2, not the UT conditions for the sensor 130*a*1. Similar to the UT conditions for the sensor 130*a*1, the UT conditions for the sensor 130*a*2 include the identification information of the connectors to which the pulsers are to be connected, the identification information of the connectors to which the receivers are to be connected, and the delay time data used for the sensor 130a2 when it has been connected to the pulsers or the receivers. The connectors that are to be connected to the pulsers and the receivers are the connectors to which the sensors 130a1 and 130a2 are connected. Additionally, the controller 110 outputs a command signal to control the switcher 140 parallel to the writing of the UT conditions for the sensor 130a2, which control is performed independently for the control of the UT device 120, thereby connecting the sensor 130a2 to the UT device 120 (FIG. 6C).

Subsequently, the UT is performed using sensor 130a2. During the UT, the connectors to which the elements of the sensor 130a2 are connected via the switcher 140 are connected by the switch circuit to the pulsers and the receivers one after another within the UT device 120 so that the UT is performed using sensor 130a2 (FIG. 6D). In this example, since the sensors 130a1 and 130a2 are connected to the same connectors, the switch circuit performs no connection switching during the transition from the UT using the sensor 130a1 to the UT using the sensor 130a2. Furthermore, the processing by the delay circuit (including the transmission of ultrasound up to the outputting of UT data to the controller 110) is substantially the same as in the UT by the sensor 130a1.

Still more, FIGS. 6A to 6D illustrate the case where the two sensors 130a1 and 130a2 are switched by the switcher 140, however, if the switcher 140 can switch three or more signal lines for each connector, three or more elements can be selectively connected to each connector. Namely, three or more sensors can be connected in a switchable manner to common connectors of the UT device 120 via the switcher 140, and the mass-sensor UT can be performed using three or more sensors. Also, if different sensors need to be used for transmission and receiving reflected waves, the pulsers and the receivers are connected to different sensors on the basis of the UT conditions. The way of the transmission and the receiving is the same manner as described in the above.

However, the mass-sensor UT described with reference to FIGS. 6A to 6D has following drawbacks. The functions of the UT device are, on the basis of the input UT conditions, connecting the pulsers and receivers to connectors, outputting electric signals to the connectors to which the pulsers have been connected, and to output the resultant signal which is the synthesized intensity input signals of the receivers. However, a conventional UT device does not have the function of controlling the switcher connected to connectors, therefore in the case that multiple elements are connected switchably to each connector via the switcher, the UT device cannot recognize which element is being connected to the switcher. Naturally, the UT device cannot include the identification information of the sensors in the input UT condition, either. For this reason, there is the situation when mass-sensor UT is performed using a conventional UT device, its controller needs to repeat a series of steps including input to the UT device the UT conditions for one of the sensors connected to the switcher, driving the switcher to connect that sensor to the UT device, and performing UT. For example, although it may vary depending on usage conditions, the total time required for a UT operation can be divided into, around one minute for writing of UT conditions on the UT device, a few seconds for sending and receiving ultrasound, and a few seconds for storing UT data on the controller, thus, the writing of UT conditions is the rate limiting process in the testing time.

When mass-sensor UT is performed in the manner as described in reference to FIGS. 6A to 6D, the rate limiting process needs to be performed every switching of the sensor, therefore, it takes a long time to obtain UT data for each sensor.

2. Embodiment

We now describe an embodiment of the invention. This embodiment is designed to reduce the time required for the acquisition of UT data in mass-sensor UT.

2-1. Overview

Figure 7A:
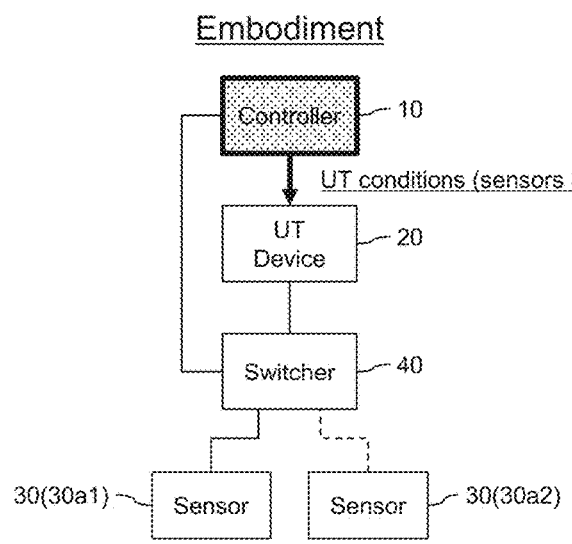
FIG. 7A is a conceptual diagram illustrating a phased array UT method according to an embodiment of the invention.
Figure 7B:
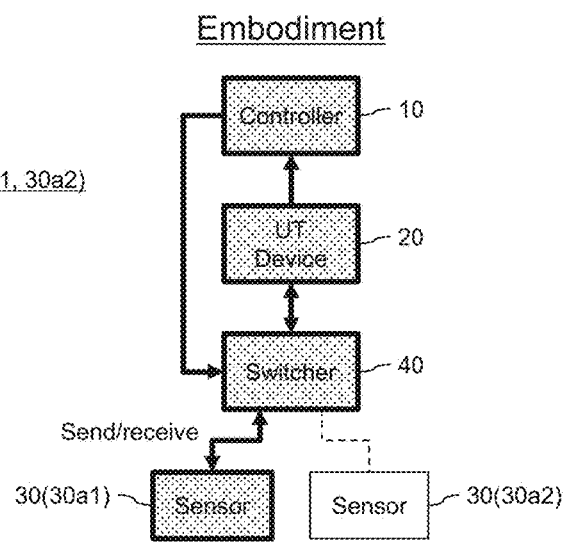
FIG. 7B is a conceptual diagram illustrating a phased array UT method according to an embodiment of the invention.
Figure 7C:
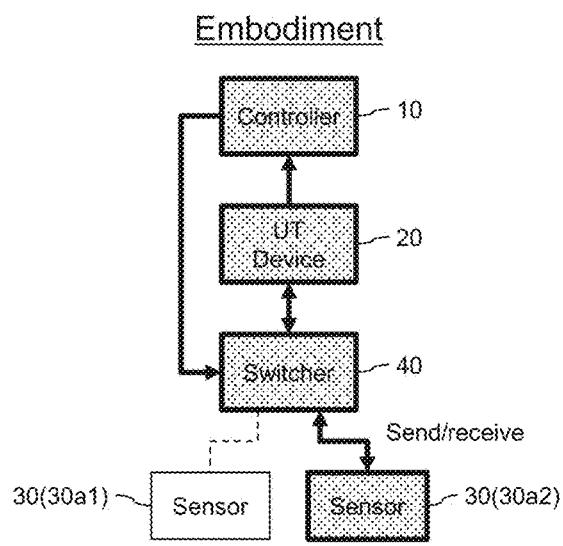
FIG. 7C is a conceptual diagram illustrating a phased array UT method according to an embodiment of the invention.

FIGS. 7A to 7C are conceptual diagrams illustrating a phased array UT method according to an embodiment of the invention, which can be contrasted with FIGS. 6A to 6D. As illustrated in FIGS. 7A to 7C, the system used in the phased array UT of the present embodiment includes a controller 10, a UT device 20, sensors 30, and a switcher 40. The present embodiment is designed for mass-sensor UT, and similar to the example described with reference to FIGS. 6A to 6D, multiple sensors 30 are connected to the UT device 20 via the switcher 40 (two sensors 30a1 and 30a2 in FIGS. 7A to 7C). The present embodiment differs from the example described with reference to FIGS. 6A to 6D in terms of the processing performed by the controller 10. The same as the UT device 120, the sensors 130, and the switcher 140 can be applied as The UT device 20, the sensors 30, and the switcher 40, respectively, which have been described in the section of technological background former. The switcher 140 can be a multiplexer, for example.

Similar to FIGS. 6A to 6D, FIGS. 7A to 7C illustrate the procedures for mass-sensor UT in which UT is performed once using the sensor 30a1, then, switch the sensor 30a2 and UT is performed again. To facilitate understanding, it is assumed that the same elements are used to transmission and receive reflected waves.

At the starting of the mass-sensor UT of the present embodiment, the UT conditions is written on the UT device 20 by the controller 10 (FIG. 7A). The UT conditions include not only the UT conditions for the sensor 30a1 but the UT conditions for the sensor 30a2. For the sake of convenience, such UT conditions used for the multiple sensors 30 are hereinafter referred to also as "the collection of UT conditions." Each conditions which are included in the collection of UT conditions comprises the identification information of the connectors to which the pulsers are to be connected, the identification information of the connectors to which the receivers are to be connected, and the delay time data used for the sensors 30a1 and 30a2 that have been connected to the pulsers or the receivers. In this example, the connectors to which the pulsers are to be connected are the connectors to which the elements of the sensors 30a1 and 30a2 are connected, and the connectors to which the receivers are to be connected are the connectors to which the elements of the sensors 30a1 and 30a2 are connected.

When the writing of the collection of UT conditions is completed, the UT is performed using sensor 30a1. During the UT, the switcher 40 is controlled by the controller 10 based on output control signal from controller 10, which control is independent from the control of the UT device 20, and the sensor 30a1 is connected to the UT device 20 (FIG. 7B). Meanwhile, although not illustrated, the connectors to which the elements of the sensor 30a1 are connected via the switcher 40 are connected by the switch circuit to the pulsers and the receivers one after another within the UT device 20 and UT is performed using sensor 30a1 (FIG. 7B). The processing of the delay circuit (including the transmission up to the outputting of UT data to the controller 10) is substantially the same as in FIGS. 6A through 6D. Since the collection of UT conditions have been written on the UT device 20, the step of FIG. 7B in which the UT is performed using sensor 30a1 based on not only the UT conditions for sensor 30a1 but the condition for UT sensor 30a2 in series. The controller 10 can be distinguish that the in the two UT data receives two pieces of UT data from the UT device 20 when it controls the switcher 40 to connect the sensor 30a1 to the UT device 20, and it can determine on the basis of the information on the order of the UT conditions included in the collection of UT conditions that the second piece of UT data is one without sensor-to-UT-condition correspondence.

The UT using the sensor 30a1 is to followed by the UT using the sensor 30a2. Unlike the example described with reference to FIGS. 6A to 6D, during the transition, the writing process of UT conditions on the UT device 20 by the controller 10 is not exit. At the beginning of the UT using sensor 30a2, the controller 10 outputs a command signal to control the switcher 40, which control is independent from the control of the UT device 20, and the sensor 30a2 is connected to the UT device 20 (FIG. 7C). Meanwhile, the connectors to which the elements of the sensor 30a2 are connected via the switcher 40 are connected by the switch circuit to the pulsers and the receivers one after another within the UT device 20, then the UT using sensor 30a2 is performed (FIG. 7C). The processing of the delay circuit is substantially the same as the UT using sensor 30a1 which is connected to the UT device 20. Since the collection of UT conditions have been written on the UT device 20, the UT using the sensor 30a1, the UT using sensor 30a2 is performed UT on the basis of their UT conditions after the UT using the sensor 30a1 in the step of FIG. 7C. The controller 10 receives two pieces of UT data from the UT device 20 when it controls the switcher 40 to connect the sensor 30a1 to the UT device 20, and it can determine on the basis of the information on the order of the UT conditions included in the collection of UT conditions that the first piece of UT data is one without sensor-to-UT-condition correspondence.

As described above, one of the features of the present embodiment is that multiple UT operations are performed successively using different sensors after a single operation of writing UT conditions and the controller is used to determine the UT data pieces with sensor-to-UT-condition correspondence among the pieces of UT data output from the UT device. This determination can be performed either before or after storing (recording) the UT data. In other words, it is possible to store only the UT data pieces with sensor-to-UT-condition correspondence or determine such UT data pieces after storing all the UT data and delete the rest.

In FIGS. 7A to 7C illustrate it is described that the case where the two sensors 30a1 and 30a2 are switched by the switcher 40, apparently, this description could be extended, in the case that sensors is three or more on the line of switcher 40, if the sensor is switcher 40 can switch three or more signal lines for each connector, three or more elements can be selectively connected to the same connectors. Furthermore, it is supposed to connect much more sensors than multi-sensor UT when mass-sensor UT is combined with multi-sensor UT. However, because there are also cases where the number of connectors in the UT device does not permit multi-sensor UT, the mass-sensor UT of the present embodiment is not necessarily on the basis of the assumption the combination of multi-sensor and mass-sensor UT. Also, if different sensors need to be used for sending ultrasound and receiving reflected waves, the pulsers and the receivers are connected to different sensors based on the UT conditions. As in the above, the transmission and the receiving are performed in a similar manner.

2-2. System

Figure 8A:
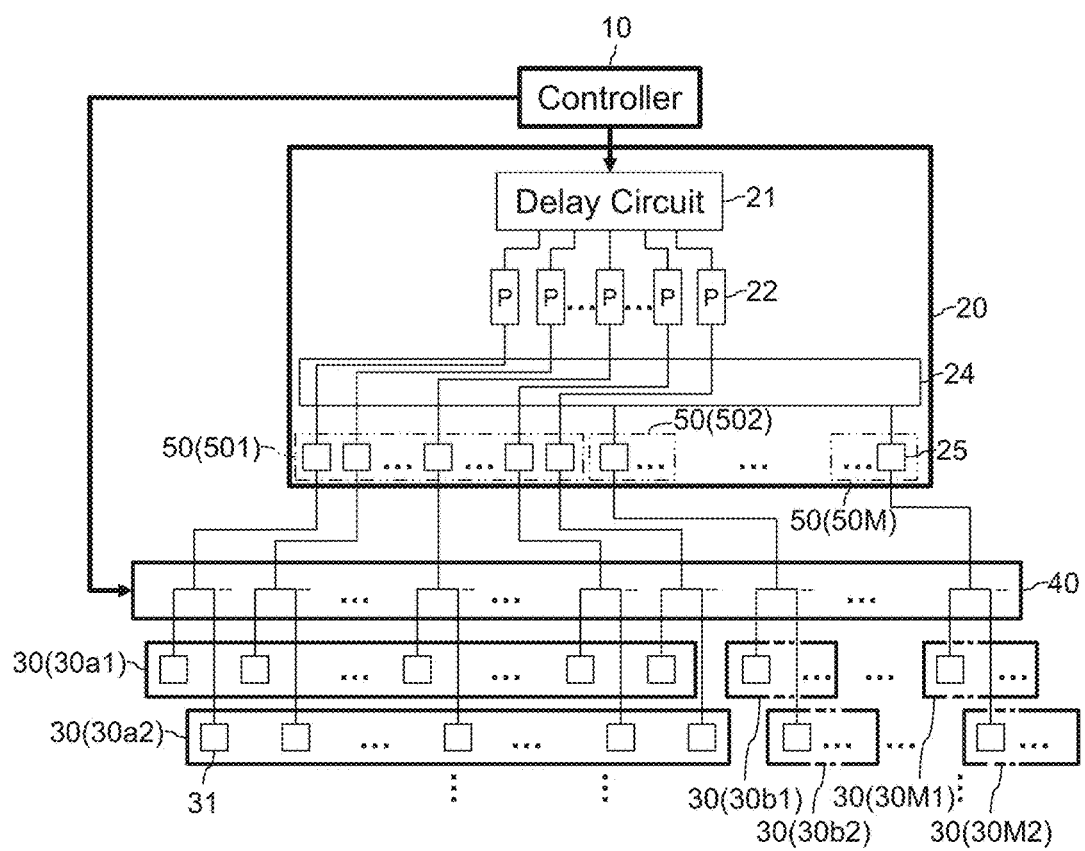
FIG. 8A is a schematic illustrating the overall structure of a UT system according to an embodiment of the invention.
Figure 8B:
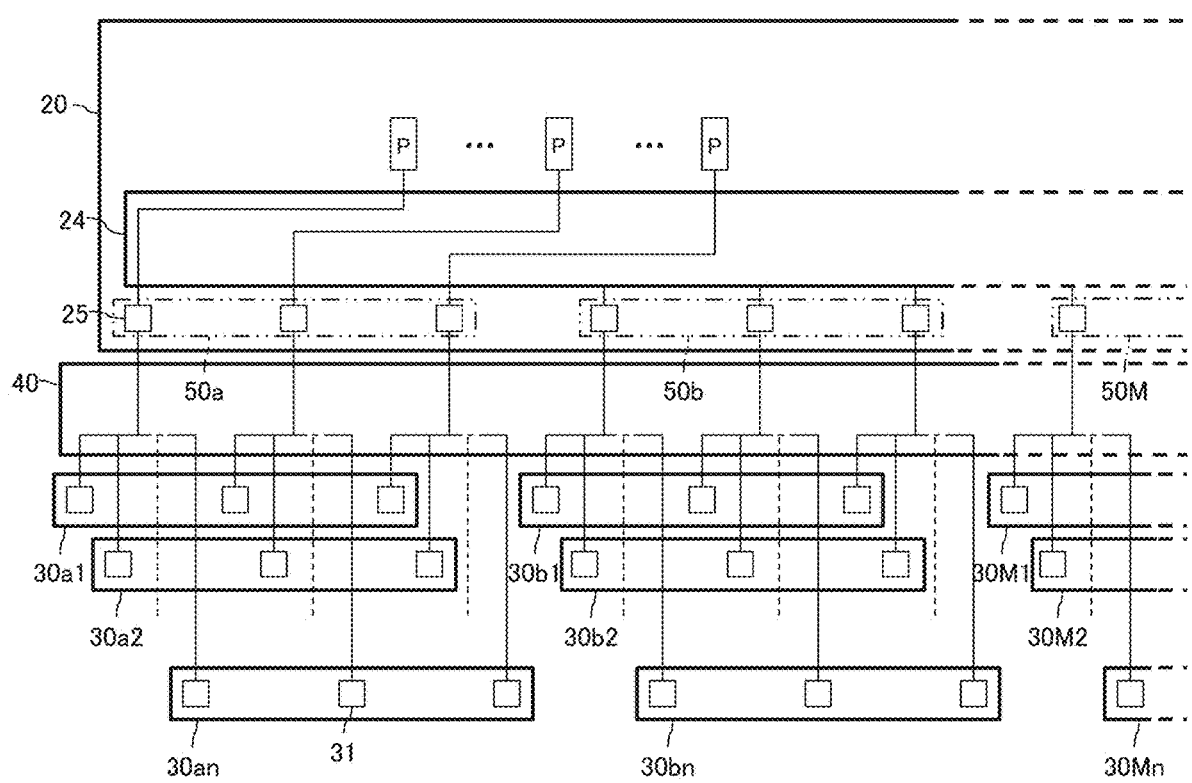
FIG. 8B is a schematic illustrating, in an extracted manner, the connections between the switcher and sensors of a UT system according an embodiment of the invention, together with associated peripheral elements.

FIG. 8A is a schematic illustrating the overall structure of a UT system according to the present embodiment while FIG. 8B is a schematic illustrating the connections between the switcher and the sensors in an extracted manner, together with associated peripheral elements. The already described elements in FIGS. 7A to 7C are referred to by the same reference numerals as those used.

The UT system illustrated in FIGS. 8A and 8B includes the controller 10, the UT device 20, the sensors 30, and the switcher 40. Similar to the UT device 120 described earlier, the UT device 20 includes a delay circuit 21, pulsers 22, receivers 23 (FIG. 9), and connectors 25.

In this example, the pulsers 22, the receivers 23, and the connectors are provided in plural inside the UT device 20 and the number of the connectors 25 exceeds that of the pulsers 22. The number of the receivers 23 is equal to or larger than that of the pulsers 22. The switcher 40 is connected to the connectors 25 of the UT device 20 (each connector includes a first terminal as described above). Each of the sensors 30 includes multiple elements 31 and is placed on a test object (for example, FIG. 1A). In the present embodiment, the sensor 30 are consisted such that the number of the elements 31 of the sensor 30 is equal to or larger than that of the pulsers 22 of the UT device 20.

In the present embodiment, a group of connectors 25 in which the number of those connectors 25 is the same as that of the pulsers 22 of the UT device 20 (m1) is treated as a cluster 50. In the case that the the number of all the connectors 25 is m2 (m2>m1), the number M of the clusters 50 becomes M (=m2/m2≥1). Multiple (an n number of) sensors 30 are connected to each cluster 50 via the switcher 40. m1, m2, and n are integers and equal to or greater than 2 (for example, m1=64), in fact, M is a number equal to or greater than 2 in the present embodiment.

As referred FIGS. 8A and 8B, among the clusters number M (from 50a to 50M) and the n number of sensors from 30a1 to 30an are connected via the switcher 40 in the first cluster 50a. Likewise, the second cluster 50b has the n number of sensors from 30b1 to 30bn connected, and the third cluster 50c (not illustrated) has the n number of sensors are connected. Also, the last cluster 50M has the n number of sensors from 30M1 to 30Mn are connected. In this way, in each cluster, a pair of elements 31 selected from n number sensors 30 are subject to the same group which are selectively connected to a common connector 25 of the UT device 20 via the switcher 40. In the present embodiment, since the plural (M number) clusters 50 are formed, elements 31 whose number is n times namely, sensors 30 whose number is (M×n=m2/m1×n) times that of the pulsers 22 of the connectors 25 are connected to the UT device 20 via the switcher 40.

2-3. Controller

Figure 9:
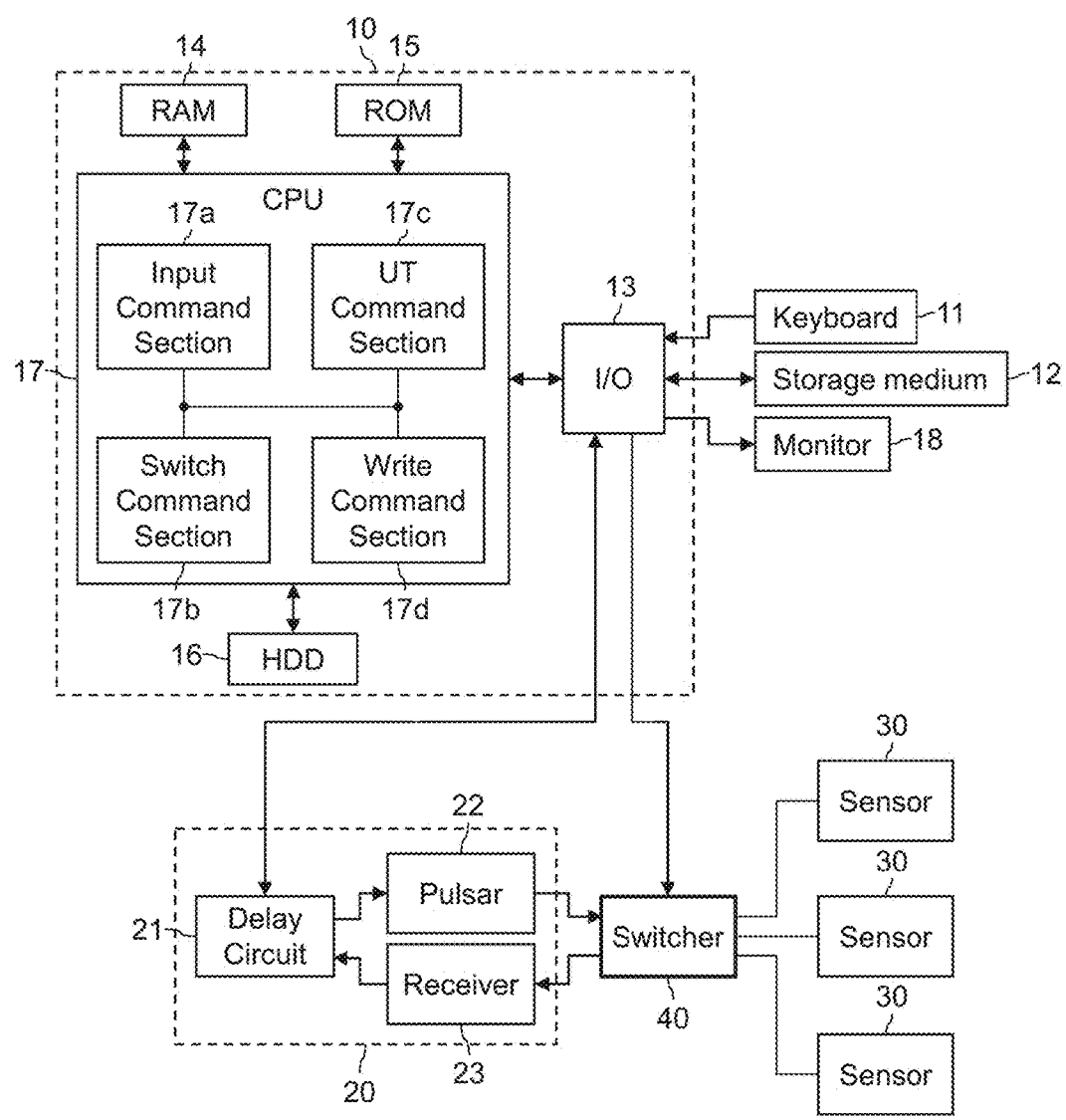
FIG. 9 is a functional block diagram illustrating the controller of a UT system according to an embodiment of the invention, together with associated elements.

FIG. 9 is a functional block diagram illustrating the controller of the UT system of the present embodiment, together with associated elements. In FIG. 9, the switch circuit 24 and the connectors 25 are omitted. Additionally, the pulsers 22 and the receivers 23 are each illustrated as a single block. The controller 10 of the present embodiment has the function of controlling the UT device 20 and the switcher 40. The UT device 20 does not have the function of controlling the switcher 40.

The controller 10 includes an I/O port 13, a RAM (random access memory), a ROM 15 (read-only memory), an HDD 16 (hard disk drive), and a CPU 17 (central processing unit). The controller 10 can be a PC (personal computer). The form of PC is not limited only as desktop, laptop, and tablet PCs.

The I/O port 13 is a hardware interface of the controller 10, and via the I/O port 13, the UT device 20 and the switcher 40 are connected to the controller 10. Additionally, input devices such as a keyboard 11 and a storage medium 12 and output devices such as a monitor 18 and the like are also connected to controller 10 via the I/O port 13. If the monitor 18 is a touchscreen type, it can also be used as an input device. A drive for the storage medium 12 can be connected to the I/O port 13, or the drive can be mounted within the controller 10. Examples of the storage medium 12 include devices such as CDs, DVDs, and Blu-ray disks and USB memories those can be connected to the I/O port 13. In addition, output device cannot be only the monitor 18 but also a printer which can be connected to the I/O port 13. Those devices are assumed to be connected in a wired connection, however, they can also be supposed to connect using a wireless network.

The RAM 14, the ROM 15, and the HDD 16 are the storage devices housed within the controller 10. Typical examples of the HDD 16 include a magnetic recording medium and an SSD. The UT data output from the UT device 20 is stored on at least one of the storage devices and the storage medium 12. Hereinafter, the term "the storage device" is at least one of the RAM 14, the ROM 15, and the HDD 16. The program used for controlling UT system and performing UT of the present embodiment is stored in storage devices. The UT program can be coded using the controller 10, also can be stored on a server of a network and installed later on at least one of the RAM 14, the ROM 15, and the HDD 16. The storage device can be either or both of a procedure storing unit on which the UT program was stored and a UT data storage unit for storing the UT data received from the UT device 20. The storage medium 12 can be either or both of the UT data storage unit and a storage medium on which the UT program was stored. The words "procedure storing unit" and "UT data storage unit" used herein refer to hardware elements within the UT system while the word "storage medium" refers to a storage medium outside the UT system. The detail of the UT program will be described later.

The CPU 17 as a computational processor, read the UT program from the storage device, executes the program to output control signals of the UT device 20 and the switcher 40, and functions as a command unit of the UT device 20 and the switcher 40. By reading the UT programs, the CPU 17 of the present embodiment configures as an input command section 17a, a switch command section 17b, a UT command section 17c, and a write command section 17d. The input command section 17a, the switch command section 17b, the UT command section 17c, and the write command section 17d perform input procedures, switch procedures, UT procedures, and write procedures, respectively. When the CPU 17 implements those sections by reading the UT program to perform the functions thereof, those sections do not have to be separated with each other. Achieved The input procedures, the switch procedures, the UT procedures, and the write procedures those are achieved by them are described in the following section of UT program.

2-4. UT Program

The procedures performed on the basis of the UT program in the previous session include input procedures, switch procedures, UT procedures, and write procedures. These procedures are performed by the CPU 17 that reads the UT program from the storage device. The input is a procedures that read a collection of UT conditions from the storage device a collection of UT conditions input through an input device such as the keyboard 11 and writing it at one time on the delay circuit 21 of the UT device 20 through the I/O port 13. As stated earlier, a collection of UT conditions is the UT conditions used for plural multiple-sensors UT. The input procedures can also include performing calculations on the UT conditions. On the occasion of the UT, an input device is used to input data including the shape of the test object, sonic speed of the test object, the UT positions in the test object, the positions of the sensors, the number and sizes of the elements, and so forth, and those input data is stored on the storage device. In the input procedures, delay times are calculated for each sensor based on the data, and the calculated delay times are arranged in the order of execution and written on the delay circuit 21 as a collection of UT conditions. The collection of UT conditions can also be stored on the storage device if necessary.

The switching procedures are those used to switch the sensors 30 to be connected to the UT device 20 by controlling the switcher 40. The testing procedures let to perform UT the UT device 20. The outputting of command signals from the CPU 17 to the switcher 40 and the inputting of UT data from the UT device 20 to the CPU 17 are both performed through the I/O port 13. The writing procedures are those used to store the UT data in which the sensors 30 used for the UT and UT conditions match on the designated location based on the order of execution of the UT conditions (on at least one of the storage device and the storage medium 12) by using an input device such as the keyboard 11. Hereinafter, the term "appropriate UT data" is used to refer to the UT data obtained by the UT device 20 in which the sensors 30 used match UT conditions.

Supplementing the UT program, it is considerable that the combination of the switch procedures, the UT procedures, and the write procedures has variants. In this time, two examples of variants are described below. In the two variants, the input the procedures are the same.

The first variant is the procedure that the appropriate UT data is selected from the UT data output from the UT device 20 and stored. Namely, each time the sensors 30 are switched by performing the switch procedures, the UT procedures are performed on the basis of a UT condition of a collection of UT conditions. For example, the first sensor 30 is connected to the UT device 20, and UT is performed on the basis of the first to third UT conditions. Then, the first sensor 30 is switched to the second sensor 30 to perform UT on the basis of the first to third UT conditions, finally, the second sensor 30 is switched to the third sensor 30 to perform UT on the basis of the first to third UT conditions. In this case, the UT device 20 outputs both the appropriate UT data and the inappropriate UT data in which the sensors 30 used for the UT do not match UT conditions. However, since the controller 10 has the information on the sensors 30 connected to the UT device 20 and the order of execution of the UT conditions, the appropriate UT data can be selected from the UT data output from the UT device 20 on the basis of the order of execution of the UT conditions during the write procedures. In this variant, a collection of UT conditions is used as the same times as the number of sensors 30.

The second variant is the procedure that stores all of the UT data output from the UT device 20 and the appropriate UT data is selected therefrom. This variant is the same as the first variant which is described in the bellow except for the writing procedures. The difference between them is whether to select the appropriate UT data before or after the writing of the UT data.

In the second variant, the appropriate UT data is selected from the UT data stored on the storage device on the basis of the order of execution of the UT conditions. For instance, The appropriate UT data can be selected from the whole UT data based on the collective UT condition, add identification information to the appropriate UT data, alternatively, the rest of the UT data can be deleted to leave only the appropriate UT data.

2-5. UT Method

Figure 10:
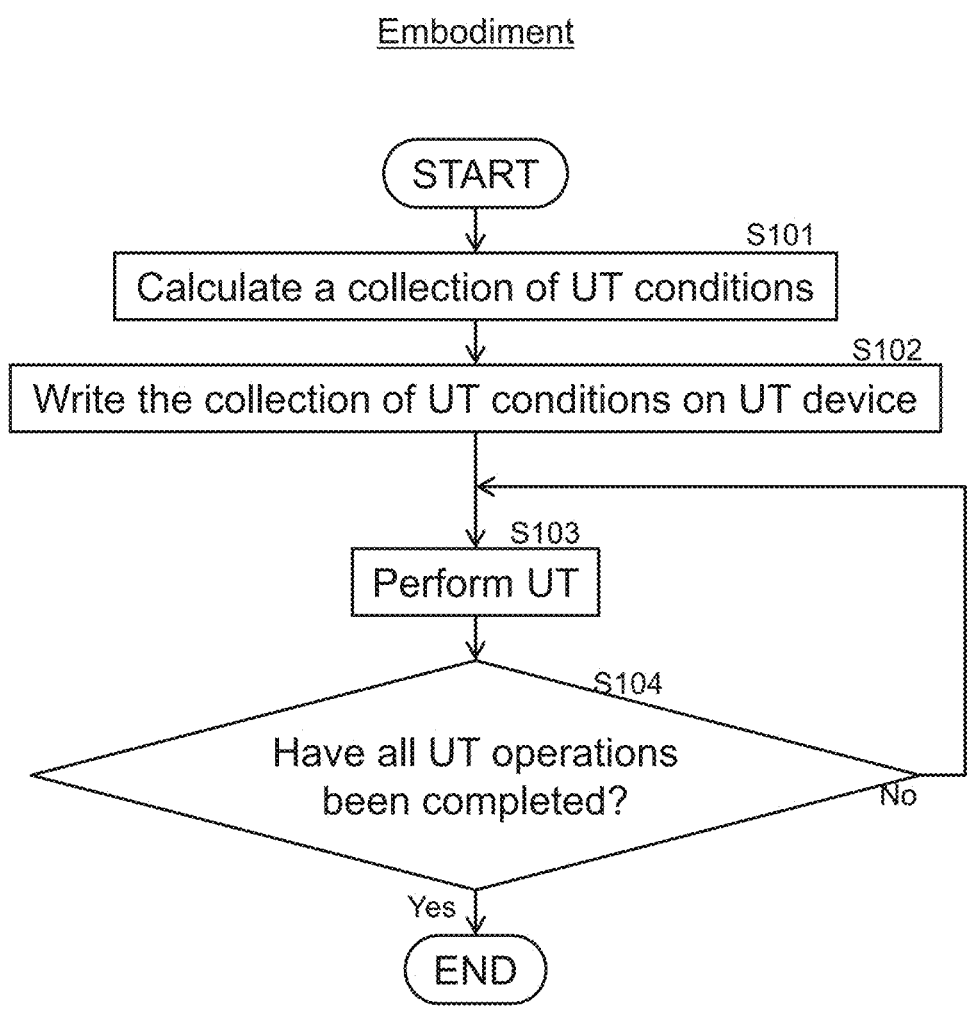
FIG. 10 is a flowchart of the UT procedures performed by the controller of a UT system according to an embodiment of the invention.

FIG. 10 is a flowchart of the UT procedures performed by the controller of the UT system of the present embodiment. Referring to FIG. 10, the UT produces of the present embodiment are described below with a UT method.

(Start—Step S102)

Before starting the phased array UT of the present embodiment, the operator places the array sensors 30, each having multiple elements 31, on a test object. Thereafter, an input device such as the keyboard 11 is used to input data to the controller 10, the data including the shape and sonic speed of the test object, the UT positions within the test object (points or an area), the positions of the sensors, the number and sizes of the elements, and so forth. The operator also instructs to the controller 10 to start signal of the UT using the input device such as the keyboard 11. According with input of the stat signal by the operators, the CPU 17 then starts the procedures of FIG. 10 (START), and the input command section 17a performs the above-described input procedures to calculate delay times for the respective sensors 30 (Step S101). After the input of start signal of the UT, the CPU 17 start the procedure as described in FIG.10 and then the input procedure 17a calculation of the delay time for the respective sensors 30. The input procedure 17a write on the delay circuit 21 of the UT device 20 a collection of UT conditions including the delay times for every sensors 30.

(Step S103—END)

After the writing of the UT conditions for the UT device 20, the CPU 17 perform the above-described switch procedures, UT procedures, and write procedures with the switch command section 17b, the UT command section 17c, respectively (Steps S103 and S104). For instance, in Steps S103 and S104, one of the three variants of the UT program is executed. Here, the following explains an example in which one sensor 30 is used by the switch command section 17b and the UT command section 17c to perform UT on the basis of the collection of UT conditions and the appropriate UT data is selected and stored. That is, the CPU 17 allows the UT command section 17c to perform UT on the basis of the collection of UT conditions and allows the write command section 17d to select the appropriate UT data and stores it secondary (Step S103). Then, the CPU 17 determines if there are any unperformed UT operations among the UT operations specified in the collection of UT conditions (Step S104). If there remains some unperformed UT operations and thus the determination in the step S104 is not satisfied, the CPU 17 allows on an as-needed basis the switch command section 17b to perform the switch procedures to switch the sensors 30 to be connected to the UT device 20, and returns the process to Step S103. If all the UT operations have been completed and the determination condition in Step S104 is satisfied, the CPU 17 ends the flow of FIG. 10.

In this way, the UT data stored on the storage device can be output as the UT results to output devices such as the monitor 18 according with the basis of an instruction command given by the operator to the controller 10 via an input device.

2-6. Advantages (1) In the present embodiment, a collection of UT conditions including a plurality of UT conditions each of which matches with the corresponding plural different sensor 30 are written at one time on the UT device 20. The UT device 20 successively performs UT operations based on the collection of UT conditions. During the UT operations, the above-described input procedure of writing UT conditions on the UT device 20 is not intervened. Since the controller 10 has the information on the UT conditions based on which the UT device 20 performs UT, it is capable of recognizing the appropriate UT data in which the sensors 30 used match UT conditions as well as the control of the switcher 40. In the present embodiment, by writing the collection of UT conditions at one time, it is not necessary to write UT conditions on the UT device 20 each time at the sensors 30 are switched, and many pieces of appropriate UT data in which different sensors 30 are used can be obtained. In this way, reducing the number of time-consuming operations of writing UT conditions on the UT device 20, the total UT time can be shortened. In accordance with the present embodiment, phased array UT can be performed efficiently by switching the multiple sensors 30 connected to the UT device 20 using the switcher 40.

(2) By using the sensors 30 whose number of elements 31 is equal to or greater than that of the pulsers 22 of the UT device 20 (for example, equating the number of the pulsers 22 and the number of the elements 31 of sensors 30), all of the pulsers 22 can be used in a single UT operation. In other words, the number of UT operations can be reduced by maximizing the number of pulsers 22 used in each UT operation. In a typical phased array UT device, the number of pulsers is the smallest numbers of collectors, pulsers, and receivers. Because the cost of the circuit to apply voltage to elements is high. Therefore, by using as many pulsers 22 as possible in a single UT operation, all of the UT operations can be performed efficiently.

2-7. Industrial Applicability

By applying the present embodiment to UT involving the use of many sensors regardless of test objects, the above advantages can be obtained. For instance, in a turbine used for power generation, small unseen cracks may be formed inside its components due to the high stress during operation. and UT is employed to examine such cracks. The UT is carried to examine the rotor of the turbine; however its casing needs to be removed for testing. Such long time stop of the turbine must be avoided, which means that UT needs to be completed in a short amount of time. In such case, applying the present embodiment reduces the time during which such turbines need to be stopped.

DESCRIPTION OF THE REFERENCE CHARACTERS

10: Controller
11: Keyboard
12: Storage medium (storage medium, UT data storage unit)
13: I/O port
14: RAM (procedure storing unit, UT data storage unit)
15: ROM (procedure storing unit, UT data storage unit)
16: HDD (procedure storing unit, UT data storage unit)
17: CPU (command unit)
17a : Input command section
17b : Switch command section 17c: UT command section
17d: Write command section
18: Monitor
20: Phased array UT device
22: Pulser
23: Receiver
25: Connector
30: Array sensor
31: Ultrasonic element
40: Switcher
50: Cluster

What is claimed is:

1. An ultrasonic testing method comprising steps of:
placing a plurality of array sensors on a test object, array sensors each having multiple ultrasonic elements;
connecting the plurality of array sensors to a phased array ultrasonic testing device such that a plurality of ultrasonic elements selected from the plurality of array sensors are set as one group, and the plurality of ultrasonic elements belonging to a same group are selectively connected to a common connector of the phased array ultrasonic testing device via a switcher;
inputting at one time to the phased array ultrasonic testing device a collection of ultrasonic testing conditions including a plurality of ultrasonic testing conditions each of which is set for one of the plurality of array sensors, the ultrasonic testing conditions including delay time information and identification information of the connectors to which pulsers and receivers of the phased array ultrasonic testing device are connected;
causing the phased array ultrasonic testing device to perform ultrasonic testing operations sequentially while switching all of the plurality of array sensors connected to the phased array ultrasonic testing device with the use of the switcher, wherein the ultrasonic testing operations are performed sequentially based on every ultrasonic testing condition included in the collection of ultrasonic testing conditions at each time the switcher switches the array sensors connected to the phased array ultrasonic testing device; and
storing ultrasonic testing data in a designated location based on the order of execution of ultrasonic testing conditions included in the collection of ultrasonic testing conditions, wherein
from the plurality of pieces of ultrasonic testing data output sequentially from the phased array ultrasonic testing device, the data in which the array sensors used for ultrasonic testing match ultrasonic testing conditions are selected based on the order of execution and stored, or
all of the plurality of pieces of ultrasonic testing data output sequentially from the phased array ultrasonic testing device are stored, and from the plurality of pieces of ultrasonic testing data stored, the data in which the array sensors used for ultrasonic testing match ultrasonic testing conditions are selected based on the order of execution.

2. The ultrasonic testing method of claim 1, wherein
a plurality of connectors of the phased array ultrasonic testing device are grouped into clusters, each of the clusters including a number of connectors equal to that of pulsers of the phased array ultrasonic testing device, and
the plurality of array sensors each having a number of ultrasonic elements equal to or greater than that of the connectors forming one of the clusters are connected to each of the clusters via the switcher.

3. An ultrasonic testing system comprising:
a phased array ultrasonic testing device having a plurality of pulsers and a plurality of receivers;
a switcher connected to connectors of the phased array ultrasonic testing device;
a plurality of array sensors placed on a test object, each of the plurality of array sensors including multiple ultrasonic elements; and
a controller for controlling the phased array ultrasonic testing device and the switcher,
the ultrasonic testing system connecting the plurality of array sensors to the phased array ultrasonic testing device such that a plurality of ultrasonic elements selected from the plural array sensors are set as one group, and the plurality of ultrasonic elements belonging to a same group are selectively connected to a common connector of the phased array ultrasonic testing device via the switcher, wherein
the controller includes:
a procedure storing unit on which an ultrasonic testing program is stored;
a command unit for executing the ultrasonic testing program stored on the procedure storing unit and outputting commands to the phased array ultrasonic testing device and the switcher; and
an ultrasonic testing data storage unit for storing ultrasonic testing data received from the phased array ultrasonic testing device, and
the command unit includes:
an input command section configured to input at one time to the phased array ultrasonic testing device a collection of ultrasonic testing conditions including a plurality of ultrasonic testing conditions each of which is set for one of the plurality of array sensors, the ultrasonic testing conditions including delay time information and identification information of the connectors to which the plurality of pulsers and the plurality of receivers are connected;
a switch command section for controlling the switcher to switch all the array sensors to be connected to the phased array ultrasonic testing device, wherein the ultrasonic testing operations are performed sequentially based on every ultrasonic testing condition included in the collection of ultrasonic testing conditions at each time the switcher switches the array sensors connected to the phased array ultrasonic testing device;
an ultrasonic testing command section for instructing the phased array ultrasonic testing device to perform ultrasonic testing; and
a write command section for writing, on the ultrasonic testing data storage unit, ultrasonic testing data in a designated location based on the order of execution of ultrasonic testing conditions included in the collection of ultrasonic testing conditions, wherein
from the plurality of pieces of ultrasonic testing data output sequentially from the phased array ultrasonic testing device, the data in which the array sensors used for ultrasonic testing match ultrasonic testing conditions are selected based on the order of execution and stored, or
all of the plurality of pieces of ultrasonic testing data output sequentially from the phased array ultrasonic testing device are stored, and from the plurality of pieces of ultrasonic testing data stored, the data in which the array sensors used for ultrasonic testing match ultrasonic testing conditions are selected based on the order of execution.

4. The ultrasonic testing system of claim 3, wherein
the connectors of the phased array ultrasonic testing device are grouped into clusters, each of the clusters including a number of connectors equal to that of the pulsers of phased array ultrasonic testing device, and
the plurality of array sensors each having a number of ultrasonic elements equal to or greater than that of the connectors forming one of the clusters are connected to each of the clusters via the switcher.

5. A non-transitory computer-readable medium storing an ultrasonic testing program for controlling an ultrasonic testing system including:
a phased array ultrasonic testing device having a plurality of pulsers and a plurality of receivers;
a switcher connected to connectors of the phased array ultrasonic testing device;
a plurality of array sensors placed on a test object, the plurality of array sensors each including multiple ultrasonic elements; and
a controller for controlling the phased array ultrasonic testing device and the switcher,
the ultrasonic testing system connecting the plurality of array sensors to a phased array ultrasonic testing device such that a plurality of ultrasonic elements each selected as one from each of the plurality of array sensors are set as one group, and the plurality of ultrasonic elements belonging to a same group are selectively connected to a common connector of the phased array ultrasonic testing device via the switcher,
wherein the ultrasonic testing program instructs the controller to perform the procedures of:
inputting at one time to the phased array ultrasonic testing device a collection of ultrasonic testing conditions including a plurality of ultrasonic testing conditions each of which is set for one of the plurality of array sensors, the ultrasonic testing conditions including delay time information and identification information of the connectors to which the plurality of pulsers and the plurality of receivers are connected;
controlling the switcher to switch all the array sensors to be connected to the phased array ultrasonic testing device, wherein the ultrasonic testing operations are performed sequentially based on every ultrasonic testing condition included in the collection of ultrasonic testing conditions at each time the switcher switches the array sensors connected to the phased array ultrasonic testing device;
causing the phased array ultrasonic testing device to perform ultrasonic testing; and
writing, on a storage unit, ultrasonic testing data in a designated location based on the order of execution of ultrasonic testing conditions included in the collection of ultrasonic testing conditions, wherein
from the plurality of pieces of ultrasonic testing data output sequentially from the phased array ultrasonic testing device, the data in which the array sensors used for ultrasonic testing match ultrasonic testing conditions are selected based on the order of execution and stored, or
all of the plurality of pieces of ultrasonic testing data output sequentially from the phased array ultrasonic testing device are stored, and from the plurality of pieces of ultrasonic testing data stored, the data in which the array sensors used for ultrasonic testing match ultrasonic testing conditions are selected based on the order of execution.

* * * * *